United States Patent
Frank et al.

[11] Patent Number: 5,727,826
[45] Date of Patent: Mar. 17, 1998

[54] BUMPER FOR VEHICLES

[75] Inventors: Simon Frank, Watterdingen; Werner Graf, Engen, both of Germany

[73] Assignee: Alusuisse Technology & Management Ltd., Switzerland

[21] Appl. No.: 752,652

[22] Filed: Nov. 19, 1996

Related U.S. Application Data

[63] Continuation of Ser. No. 560,530, Nov. 17, 1995, abandoned.

[30] Foreign Application Priority Data

Dec. 23, 1994 [CH] Switzerland ............... 3927/94
Apr. 13, 1995 [CH] Switzerland ............... 1082/95

[51] Int. Cl.$^6$ ............................................ B60R 19/18
[52] U.S. Cl. ................................. 293/102; 296/146.6
[58] Field of Search ......................... 293/102, 120–122; 296/205, 146.6; D25/119; 52/737.6

[56] References Cited

U.S. PATENT DOCUMENTS

| | | | |
|---|---|---|---|
| 4,986,597 | 1/1991 | Clausen | 296/205 |
| 5,340,178 | 8/1994 | Stewart | 293/122 |

FOREIGN PATENT DOCUMENTS

| | | | |
|---|---|---|---|
| 0330759 | 9/1989 | European Pat. Off. | 296/188 |
| 6142754 | 5/1994 | Japan. | |

Primary Examiner—Dennis H. Pedder
Attorney, Agent, or Firm—Bachman & LaPointe, P.C.

[57] ABSTRACT

A bumper for vehicles, in particular for private cars, features an extruded section of light metal alloy that can be attached to the vehicle and exhibits in the form of section walls (12, 14) a compression wall (12) and a tension wall (14) that are spaced a distance (1) apart and a pair of transverse walls (16,18) that join these to form a hollow section, where at least one transverse strut (20, 22, 24) is provided between the transverse walls (16,18), joins these walls (12, 14) to each other and divides the hollow section into chambers. A vertical strut (26) is provided between the section walls (12, 14) joining the both transverse walls (16, 18) to each other and dividing the hollow section into a primary deformation part (A) with the chambers (30) bordering onto the compression wall (12) and a secondary deformation part (B) with chambers (32) bordering onto the tension wall (14).

8 Claims, 3 Drawing Sheets

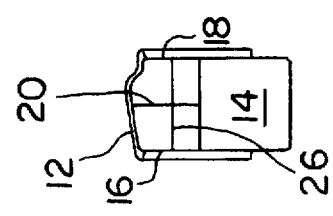
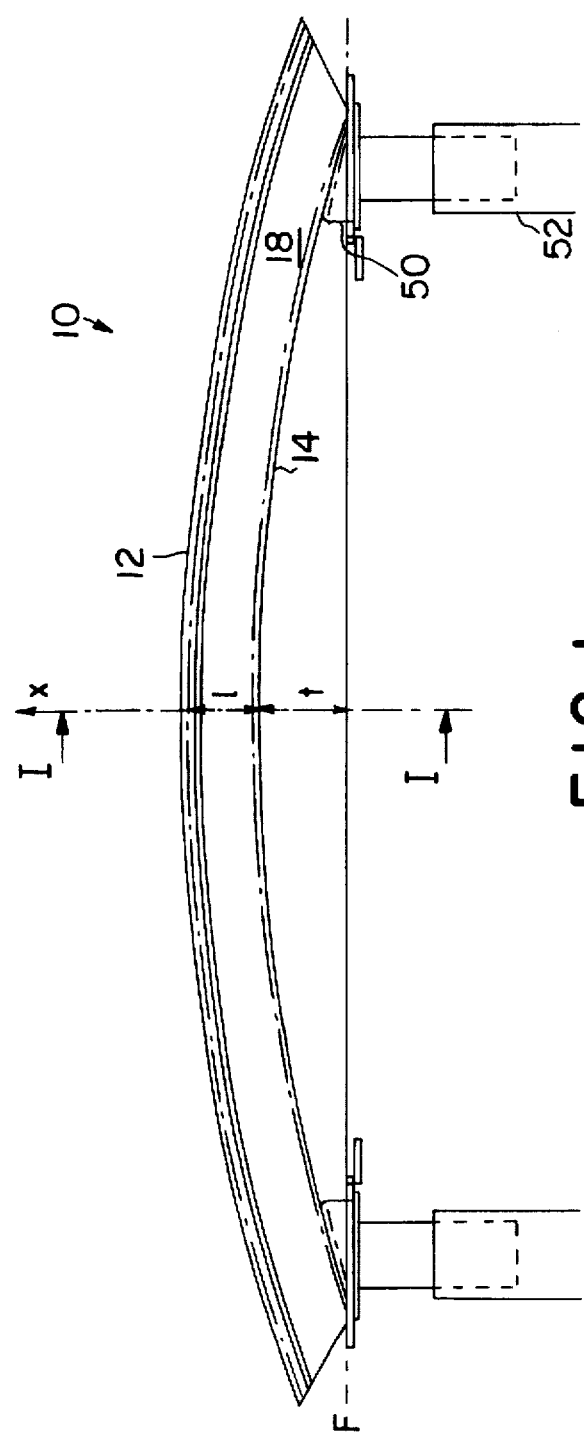

BUMPER FOR VEHICLES

This is a Continuation of application Ser. No. 08/560,530, filed Nov. 17, 1995, now abandoned.

BACKGROUND OF THE INVENTION

The invention relates to a bumper for vehicles, in particular for private cars, that has an extruded section of light metal alloy that can be attached to the vehicle and features in the form of section walls a compression wall and a tension wall that are spaced a distance apart and a pair of transverse walls that join these to form a hollow section, where at least one transverse strut is provided between the transverse walls, joins these walls to each other and divides the hollow section into chambers.

Bumper sections of the kind mentioned at the start have the known advantage of low weight. It turns out, however, that their low capacity for shape retention, due to deformation as a result of a strong collision, is a disadvantage.

SUMMARY OF THE INVENTION

In view of this, the object of the present invention is to provide a bumper of the kind discussed above, which is low in weight and exhibits a high capacity for shape retention along with adequate capacity to acommodate the deformation energy of impact.

That object is achieved by way of the invention in that a vertical strut is provided between the section walls, joining the both transverse walls to each other and dividing the hollow section into a primary deformation part with the chambers bordering onto the compression wall and a secondary deformation part with chambers bordering onto the tension wall.

Further features of the invention are discussed hereinbelow.

The cross-section shape according to the invention leads to better elimination of the energy of impact than is the case with state-of-the-art bumpers. The vertical strut between the compression wall and the tension wall divides the hollow section into two deformation zones. One (primary or secondary) deformation part absorbs the energy of impact on the bumper as it is struck, while the (secondary or primary) deformation part exhibits residual stability for a certain time thus contributing to shape retention.

The above mentioned effect can be reinforced by the following measures:

The thickness of the transverse wall and/or the transverse strut in the primary deformation part is larger or smaller than the corresponding thickness in the secondary deformation part.

The transverse walls and/or the transverse struts in the primary or in the secondary deformation part are made to bulge out by a given amount.

An additional chamber is provided on the chamber of the secondary deformation part. This additional chamber may be extruded as an integral part of the bumper section. Alternatively, the additional chamber may be releasably joined to the bumper section by means of a sidewall with projections that engage in grooves provided by flanges on the transverse wall. The additional chamber is preferably situated on the tension wall in the region of the point of intersection of the vertical projection line from the tension wall to the region of the compression wall furthest removed from the tension wall i.e. the additional chamber lies in the extension of that region which is first deformed by impact.

In a further exemplified embodiment of the bumper according to the invention the transverse struts are divided such that they form sub-struts displaced a distance along the vertical strut with respect to each other. Here it is only essential that the transverse struts do not run continuously from one section wall to the other. The number of sub-struts in the primary deformation part may therefore also be larger or smaller than the number of sub-struts in the secondary deformation part.

As a result of the sub-struts being displaced with respect to each other, when impact occurs initially rotation takes place in the region of the displacement which, with increasing deformation of the bumper, leads to further deformation by bending. This way the deformation energy due to impact can be absorbed by bending, practically until the end of the deformation process

BRIEF DESCRIPTION OF THE DRAWINGS

Further advantages, features and details of the invention are revealed by way of the following description of preferred exemplified embodiments and with the aid of the drawings which are shown schematically in:

FIG. 1 plan view of a bumper;

FIG. 2 cross-section through the bumper in FIG. 1 along line I—I;

DETAILED DESCRIPTION OF PREFERRED EMBODIMENTS

Figure 3:
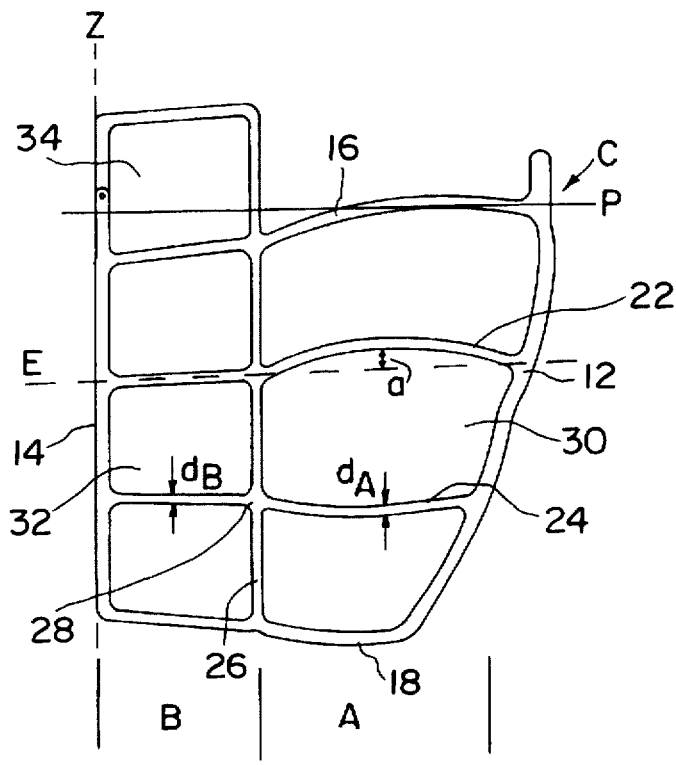
FIG. 3 cross-section through a second version of a bumper.

Shown in FIG. 1 is a bumper 10 of a private car which for reasons of clarity is not shown here. The bumper 10 is mounted onto the longitudinal frame members 52 of the vehicle by means of brackets 50. The bumper 10 is an aluminum extruded section that has been bent outwards by a distance t at the center of an imaginary front line F on the private car.

The bumper 10 features, as shown in FIGS. 1 to 4, two section walls 12, 14 a distance 1 apart, that are supplemented by transverse walls 16, 18 to form a box-shaped hollow section. As installed, the section wall 12 facing away from the vehicle represents the outer or compression wall that accommodates the impact, while the section wall 14 facing the vehicle represents the inner or tension wall.

Figure 4:
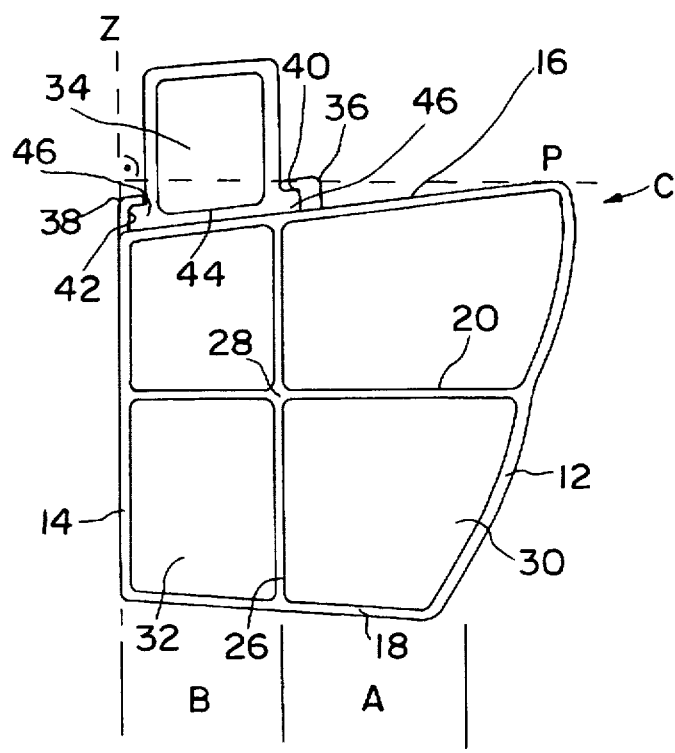
FIG. 4 cross-section through a third version of a bumper.

Shown in FIGS. 1 and 4 in the middle of both transverse walls 16, 18 is a transverse strut 20 that joins the section walls 12, 14 and is intersected by a vertical strut 26 joining the transverse walls 16, 18 forming a nodal line 28. The box-shaped section of the bumper 10 is divided into chambers 30, 32 by the central strut 20 and the vertical strut 26. Thereby, chamber 30 lying between the compression wall 12 and the vertical strut 26 forms a primary deformation part A, while chamber 32 lying between the vertical strut 26 and the tension wall 14 forms a secondary deformation part B.

In the exemplified embodiment of a bumper shown in FIG. 3 the secondary deformation part B is supplemented by an additional chamber 34. The additional chamber 34 is situated on the tension wall area z in the region of the point of intersection of the vertical projection line p from the tension wall 14 to the region of the compression wall 12 furthest removed from the tension wall 14. In this version, instead of one central transverse strut, two transverse struts 22, 24 are provided between the compression wall 12 and the tension wall 14 at an equal distance from the transverse walls 16, 18. In the primary deformation part A the transverse walls 16, 18 and the transverse struts 22, 24 bulge outwards by a distance a with respect to an imaginary transverse strut plane E. In addition to, or as an alternative to this bulging, the thickness $d_A$ of the transverse walls 16, 18 or transverse struts 22, 24 in the primary deformation part A may be smaller or larger than the thickness $d_B$ of the transverse walls or struts in the secondary deformation part B.

In further versions the secondary deformation part B, by comparison with the primary deformation part A, is weakened in that the transverse walls 16, 18 and the transverse struts 22, 24 bulge out in the secondary deformation part B and/or the thickness $d_B$ of the transverse walls 16, 18 or the transverse struts 22, 24 in the secondary deformation part B is smaller than the thickness $d_A$ of the transverse walls and the transverse struts in the primary deformation part A.

In the exemplified embodiment of a bumper shown in FIG. 4 the additional chamber 34 in the secondary deformation part B is releasably attached to the extruded bumper section. To that end, flanges 36, 38 with facing grooves 40, 42, are provided on transverse wall 16. Flanges 46 on a sidewall strip 44 of the additional chamber 34 engage in these grooves 42.

Figure 7:
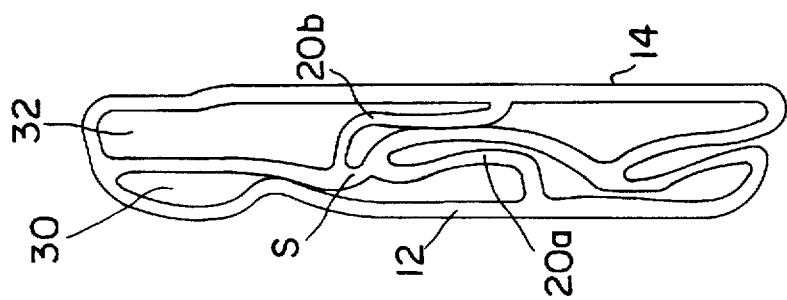
FIG. 7 cross-section through the a bumper shown in FIG. 6 after deformation.
Figure 6:
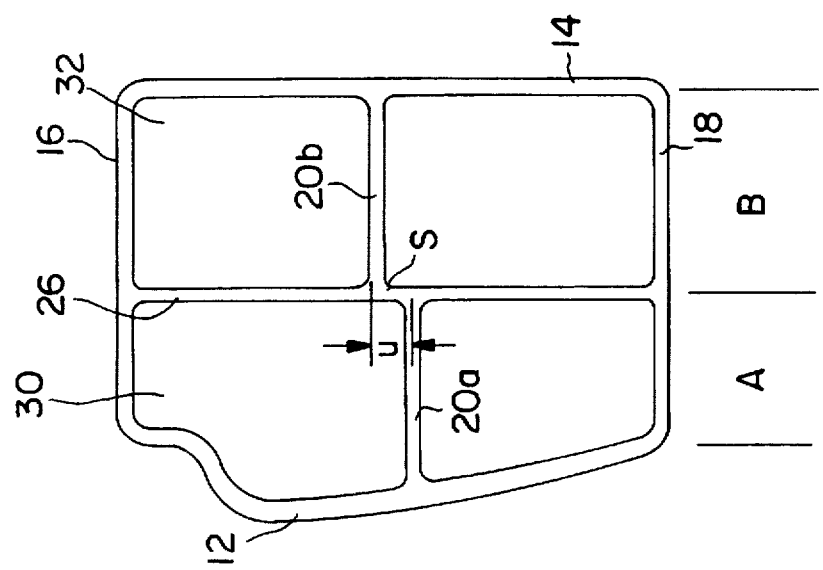
FIG. 6 cross-section through a fifth version of a bumper.
Figure 5:
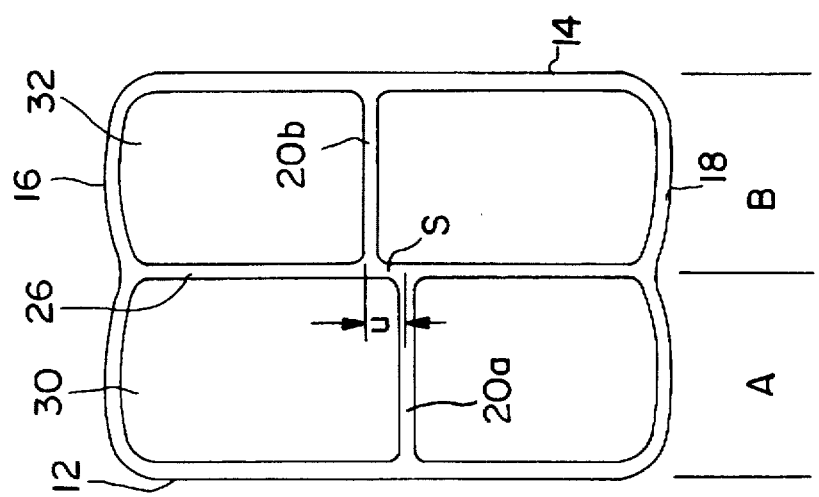
FIG. 5 cross-section through a fourth version of a bumper.

In a version shown in FIGS. 5 and 6, in contrast to the previous examples with continuous transverse struts, the central transverse strut 20 is displaced by a distance u at the vertical strut 26 and forms two sub-struts 20a, b. The number of sub-struts 20a in the primary deformation part A may be larger or smaller than the number of sub-struts 20b in the secondary deformation part B. In FIG. 5, two sub-struts 20a are shown in the primary deformation part A. From FIG. 7 it can be seen that in a collision, a rotation initially occurs between the sub-struts 20a, b in region S of the vertical strut 26. This leads to further deformation by bending so that in total more deformation energy can be absorbed than is the case with the continuous transverse struts 20, 22 or 24. It should be mentioned here that it is not necessary for the bumper to be curved. Likewise, the shape and angle of the compression wall 12, with respect to the tension wall 14, may vary, essentially in keeping with the aesthetic needs of the designer. When the bumper is at the finishing stage, these are partially or completely covered over by a layer of plastic.

We claim:

1. A bumper for vehicles, which comprises: an extruded section of light metal alloy that can be attached to the vehicle and features section walls of a compression wall and a tension wall that are spaced a distance apart, and a pair of transverse walls that join the compression and tension walls to form a hollow section; at least one transverse strut provided between the transverse walls which joins the section walls to each other and divides the hollow section into chambers; a vertical strut provided between the section walls joining the transverse walls to each other and dividing the hollow section into a primary deformation part (A) including the chambers bordering onto the compression wall and a secondary deformation part (B) including the chambers bordering onto the tension wall; and wherein at least one of the transverse walls and the at least one transverse strut in the primary deformation part (A) is bulged out of the plane of a straight line between the compression and tension walls in the form of an arched curve from the vertical strut to the compression wall.

2. A bumper for vehicles, which comprises: an extruded section of light metal alloy that can be attached to the vehicle and features section walls of a compression wall and a tension wall that are spaced a distance apart, and a pair of transverse walls that join the compression and tension walls to form a hollow section; at least one transverse strut provided between the transverse walls which joins the section walls to each other and divides the hollow section into chambers; a vertical strut provided between the section walls joining the transverse walls to each other and dividing the hollow section into a primary deformation part (A) including the chambers bordering onto the compression wall and a secondary deformation part (B) including the chambers bordering onto the tension wall; and wherein an additional chamber enlarging the height of the secondary deformation part (B) is joined to the secondary deformation part (B), wherein the additional chamber has a width substantially the same as a width of the secondary deformation part (B).

3. Bumper according to claim 2, wherein the additional chamber is an extruded integral part of the bumper section.

4. Bumper according to claim 2, wherein the additional chamber is releasably joined to the bumper section via a side wall strip with projections that engage in grooves formed by flanges on at least one transverse wall.

5. Bumper according to claim 2, wherein the compression wall is spaced from the tension wall at a distance that is a variable distance, and wherein the additional chamber is joined to the secondary deformation part in a region where the compression wall is furthest spaced from the tension wall.

6. A bumper for vehicles, which comprises: an extruded section of light metal alloy that can be attached to the vehicle and features section walls of a compression wall and a tension wall that are spaced a distance apart, and a pair of transverse walls that join the compression and tension walls to form a hollow section; at least one transverse strut provided between the transverse walls which joins the section walls to each other and divides the hollow section into chambers; a vertical strut provided between the section walls joining the transverse walls to each other and dividing the hollow section into a primary deformation part (A) including the chambers bordering onto the compression wall and a secondary deformation part (B) including the chambers bordering onto the tension wall; and wherein an intersection of said at least one transverse strut with the vertical strut in the primary deformation part is offset from an intersection with the vertical strut in the secondary deformation part, forming sub-struts thereby, in order to effect a rotary movement between the sub-struts upon collision.

7. Bumper according to claim 6, wherein the number of sub-struts in the primary deformation part (A) differs from the number of sub-struts in the secondary deformation part.

8. Bumper according to claim 1, wherein at least one transverse strut in only one of the primary deformation part (A) and the secondary deformation part (B) is bent.

* * * * *